United States Patent
Lau et al.

(10) Patent No.: US 10,032,151 B2
(45) Date of Patent: Jul. 24, 2018

(54) POINT-OF-SALE LOCATION CHECK FOR PAYMENT CARD PURCHASES

(71) Applicant: Verizon Patent and Licensing Inc., Arlington, VA (US)

(72) Inventors: Priscilla Lau, Fremont, CA (US); Lalit R. Kotecha, San Ramon, CA (US); Kumar Sanjeev, San Ramon, CA (US); Mingxing S. Li, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 233 days.

(21) Appl. No.: 14/289,229

(22) Filed: May 28, 2014

(65) Prior Publication Data
US 2015/0347999 A1    Dec. 3, 2015

(51) Int. Cl.
*G07B 17/00* (2006.01)
*G06Q 20/20* (2012.01)
*G06Q 20/32* (2012.01)
*G06Q 20/40* (2012.01)

(52) U.S. Cl.
CPC .............. *G06Q 20/20* (2013.01); *G06Q 20/32* (2013.01); *G06Q 20/327* (2013.01); *G06Q 20/3224* (2013.01); *G06Q 20/3278* (2013.01); *G06Q 20/4014* (2013.01)

(58) Field of Classification Search
CPC ................................ G06Q 30/00; G06Q 20/00
See application file for complete search history.

(56) References Cited

U.S. PATENT DOCUMENTS

| | | | | |
|---|---|---|---|---|
| 2002/0143655 | A1* | 10/2002 | Elston | G06Q 20/02 705/26.81 |
| 2008/0249939 | A1* | 10/2008 | Veenstra | G06Q 20/12 705/44 |
| 2010/0223145 | A1* | 9/2010 | Dragt | G06Q 20/20 705/17 |
| 2012/0244885 | A1* | 9/2012 | Hefetz | G06O 20/32 455/456.2 |
| 2012/0330788 | A1* | 12/2012 | Hanson | G06Q 30/06 705/26.41 |
| 2014/0358769 | A1* | 12/2014 | Howe | G06Q 20/12 705/39 |

OTHER PUBLICATIONS

Webopedia—biometrics.*

* cited by examiner

*Primary Examiner* — Talia F Crawley

(57) ABSTRACT

Credit card fraud prevention techniques are disclosed in which the authorization of a payment card may be performed using information obtained from a mobile device (e.g., a smart phone) associated with a user who initiates a point-of-sale payment card transaction. In one implementation, a device may receive a request for authorization of a payment associated with a payment card; and obtain location information relating to a location of a mobile device associated with a user of the payment card. The device may determine, based at least on a location of the point-of-sale terminal and the location of the mobile device, whether to authorize the request for authorization of the payment.

17 Claims, 9 Drawing Sheets

300 →

| 310 Mobile Device ID | 315 Subscriber ID | 320 Acount ID | 325 Location |
|---|---|---|---|
| AC123456789012 | 404685505601234 | smith | (lat = 27.175015, long = 78.042155) |
| AC12345678B112 | 514685505601734 | jones | (lat = 38.907231, long = -77.036464) |
| ⋮ | ⋮ | ⋮ | ⋮ |

| 355 Acount ID | 360 Mobile Device Info |
|---|---|
| smith | <image> |
| jones | <passcode> |
| ⋮ | ⋮ |

Fig. 3B

POINT-OF-SALE LOCATION CHECK FOR PAYMENT CARD PURCHASES

BACKGROUND

A payment card is a card that can be used by a cardholder to make a payment for purchase. Typically, a payment card is electronically linked to an account or accounts belonging to the cardholder. A number of payment cards are known, including credit cards and debit cards.

Credit card fraud is a wide-ranging term for theft and fraud committed using payment cards. One type of credit card fraud includes point-of-sale (POS) credit card fraud, in which a thief presents a stolen payment card while making a purchase at the merchant premises. In this type of fraud, the thief essentially impersonates the true owner of the payment card in order to obtain merchandise from the merchant.

BRIEF DESCRIPTION OF THE DRAWINGS

FIGS. 3A and 3B are diagrams illustrating example data structures;

DETAILED DESCRIPTION OF PREFERRED EMBODIMENTS

The following detailed description refers to the accompanying drawings. The same reference numbers in different drawings may identify the same or similar elements.

Techniques described herein may provide for credit card fraud protection using techniques in which the authorization of a payment card may be performed using information obtained from a mobile device (e.g., a smart phone) associated with a user that initiates a point-of-sale payment card transaction. In one implementation, the location of the mobile device associated with the user may be obtained as part of the authorization process for the point-of-sale transaction. In another implementation, information relating to the user of the mobile device (e.g., a passcode, mobile device identification value, or other information) may be automatically obtained and used as part of the authorization process for the point-of-sale transaction. In both of these situations, the authorization system may be able to obtain additional assurances that the registered user of the payment card is the actual user that is making the point-of-sale transaction.

Figure 1A:
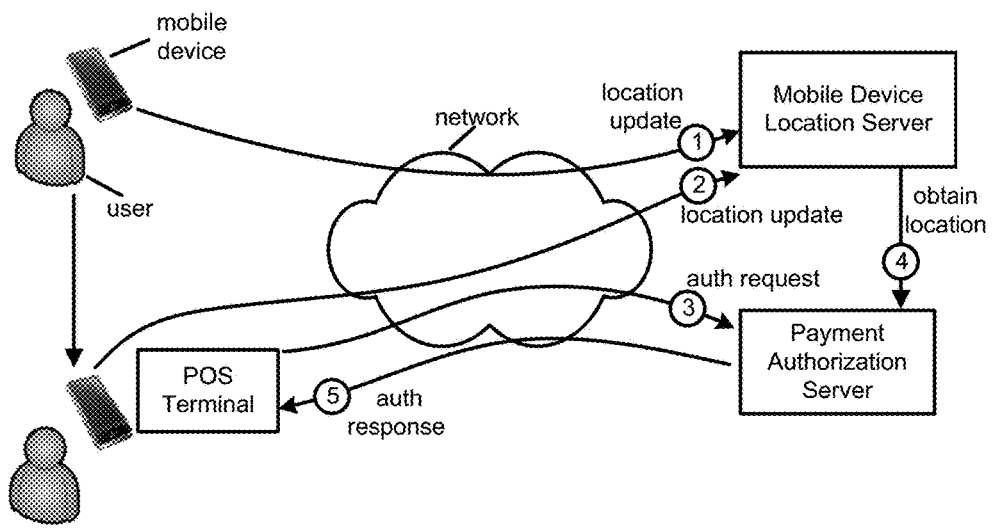
FIGS. 1A and 1B are diagrams illustrating examples of overviews of concepts described herein.
Figure 1B:
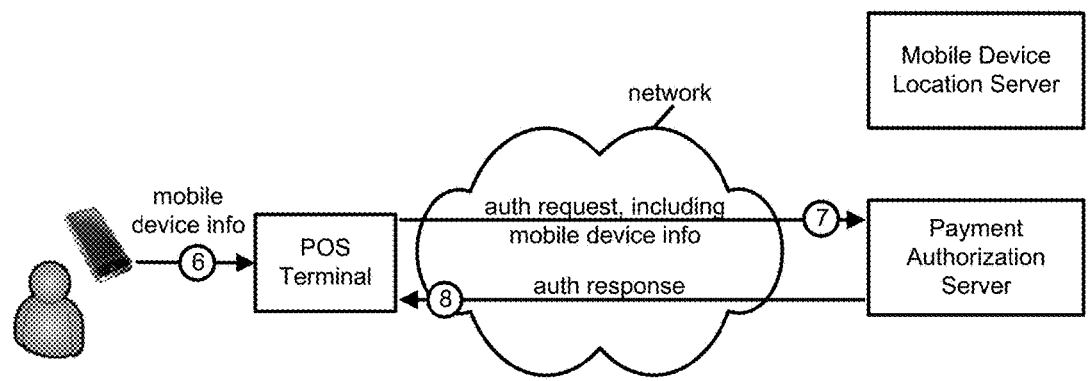

FIGS. 1A and 1B are diagrams illustrating examples of overviews of concepts described herein. As illustrated, a mobile device may be associated with a user who wishes to pay a merchant, using a payment card, at a point-of-sale (POS) terminal associated with the merchant. Authorization for the payment card transaction may be performed using one or more remote servers, shown as: a mobile device location server and a payment authorization server. A network, such as the Internet or private network, may provide network connectivity to the mobile device, the POS terminal, the mobile device location server, and the payment authorization server.

As illustrated in FIG. 1A, the mobile device location server may maintain information relating to the current location of the mobile device. For example, the mobile device may determine its location, such as by using GPS location detection techniques or cell sites and sector ID in a wireless network that the mobile device is registered. The mobile device may periodically or occasionally update the mobile device location server with the current location of the mobile device (arrow 1, "location update"). At some point, assume that the user of the mobile device wishes to make a POS transaction at a merchant. While at or near the merchant, the mobile device may again update the mobile device location server with the current location of the mobile device (arrow 2, "location update"). As part of the payment card transaction, the POS terminal, associated with the merchant, may request authorization for the transaction from the payment authorization server (arrow 3, "auth request"). The payment authorization server may correspondingly obtain, from the mobile device location server, the location of the mobile device associated with the user (arrow 4, "obtain location").

The payment authorization server may determine whether to authorize the payment request. The payment authorization server may take into account a number of factors when determining to authorize the payment request, such as: the amount of the purchase, a credit line available to the user, a fraud rate associated with the merchant, and/or other information. Consistent with aspects described herein, the payment authorization server may also use the obtained location of the mobile device when determining whether to authorize the payment request. For example, if the location of the POS terminal is significantly different than the obtained location of the mobile device, such as more than certain distance apart or in a different area, city, state or country, the payment authorization server may determine to decline the transaction or request that the merchant obtain additional user identification information from the user before approving the transaction. The authorization response may be transmitted to the POS terminal (arrow 5, "auth response").

FIG. 1B illustrates an overview of a another potential implementation consistent with aspects described herein. As illustrated in the example of FIG. 1B, in response to the user initiating payment with a payment card, the mobile device of the user and the POS terminal may exchange information relating to the mobile device and/or the user (arrow 6, "mobile device info"). The information may include, for example, a passcode, an image, a value associated with mobile device, or some other information. In general, the information may be used to identify the particular mobile device and/or user. The information may be exchanged automatically (i.e., without the user having to interact with the mobile device). Alternatively, in some implementations, the user may explicitly initiate the interaction of the mobile device with the POS terminal. The information may be exchanged using a short range wireless connection, such as a connection based on near field communication (NFC), Wi-Fi, Bluetooth, or some other short range wireless technology.

As part of the payment card transaction, the POS terminal may request authorization for the transaction from the payment authorization server. The request may include the obtained mobile device information (arrow 7, "auth request, including mobile device info"). The payment authorization server may determine whether to authorize the payment request. The payment authorization server may take into account a number of factors (e.g., as mentioned with respect to FIG. 1A) when determining to authorize the payment request. Consistent with aspects described herein, the payment authorization server may also use the obtained mobile device information when determining whether to authorize the payment request. Alternatively or additionally, in some implementations, the payment authorization server may use the location of the mobile device, such as a location obtained from the mobile device location server, when determining whether to authorize the payment request. For example, if the mobile device information includes a value identifying the particular mobile device, and the particular mobile device matches the mobile device that is registered with the user and/or the payment card, the payment authorization server may have higher confidence that the transaction is not fraudulent and may approve the payment transaction. The authorization response, indicating whether or not the payment transaction is approved, may be transmitted to the POS terminal (arrow 8, "auth response").

Figure 2:
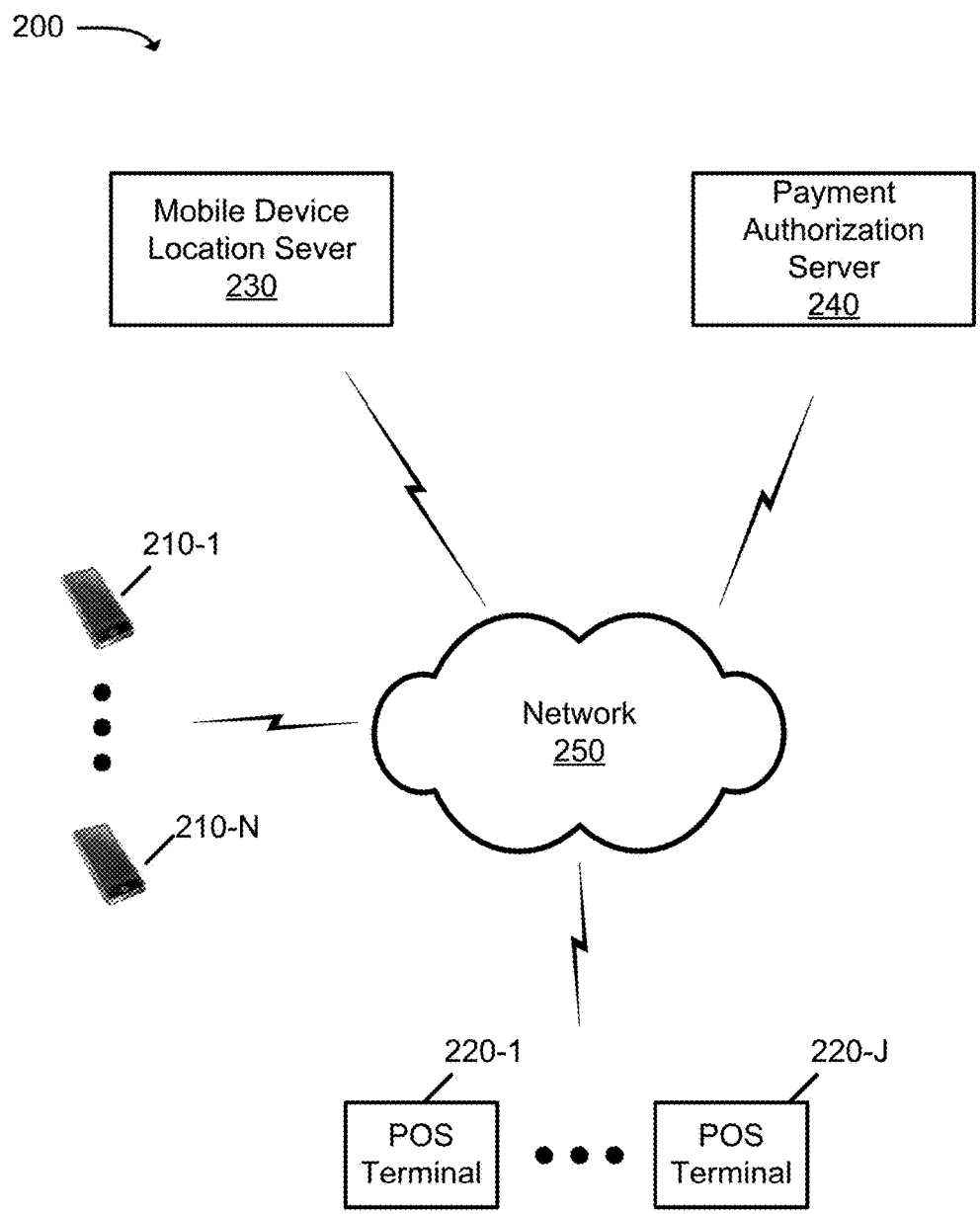
FIG. 2 is a diagram of an example environment in which systems and/or methods described herein may be implemented.

FIG. 2 is a diagram of an example environment 200, in which systems and/or methods described herein may be implemented. As shown in FIG. 2, environment 200 includes mobile devices 210-1 through 210-N (where N is an integer greater than or equal to one, hereinafter sometimes referred to individually as "mobile device 210" and collectively as "mobile devices 210"), POS terminals 220-1 through 220-J (where J is an integer greater than or equal to one, hereinafter sometimes referred to individually as "POS terminal 220" and collectively as "POS terminals 220"), mobile device location server 230, payment authorization server 240, and network 250.

Mobile devices 210 may each include a computing and communication device capable of communicating via a network, such as network 250. For example, mobile device 210 may correspond to a mobile communication device (e.g., a smart phone or a personal digital assistant (PDA)), a portable computer device (e.g., a laptop or a tablet computer), a gaming device, or another type of computing and/or communication device. Mobile device 210 may include logic to determine the location of the mobile device. For example, mobile device 210 may use GPS or other techniques to determine the current location of mobile device 210. Mobile device 210 may also include the ability to communicate via direct short range wireless connections, such as via Wi-Fi, Bluetooth, NFC, etc.

POS terminals 220 may each include one or more devices designed to process payment card transactions at merchant locations. A POS terminal 220 may include, for example, a magnetic card reader to read information from payment cards that are swiped through POS terminal 220, a network connection to provide connectivity, through network 250, to payment authorization server 240, a display to present information, and/or one or more buttons, keys, or other mechanism through which a user may interact with POS terminal 220.

Mobile device location server 230 may include one or more computing devices, such as a server device or a collection of server devices. Mobile device location server 230 may be used to maintain location information relating to mobile devices 210. In one implementation, mobile device location server 230 may be implemented by a telecommunications provider, such as a telecommunications provider associated with a particular wireless network (e.g., a cellular network). In this situation, the telecommunications provider may keep track of the location of mobile devices 210 that are associated with the telecommunications provider. The corresponding location information may be provided to entities that provide payment cards (e.g., credit card companies).

The location of mobile devices 210, as stored in mobile device location server 230, may be determined in a number of ways. For example, when mobile device 210 initially attaches to a cellular network or to base station of the cellular network, the location of the base station may be determined and provided to mobile device location server 230. Alternatively or additionally, mobile devices 210 may include GPS logic to determine the location of mobile devices 210, which mobile devices 210 may transmit to mobile device location server 230. Other techniques for determining the location of mobiles device 210, such as triangulation using base stations, may alternatively or additionally be used.

Payment authorization server 240 may include one or more computing devices, such as a server device or a collection of server devices. Payment authorization server 240 may generally act to receive authorization requests, for payments associated with payment cards, from POS terminals 220. In response, payment authorization server 240 may determine to authorize the request, decline to authorize the request, or respond in another way to the request (e.g., conditionally authorize the request based on the merchant checking an additional form of identification, indicate that the request is high risk but leave the final decision up to the merchant, etc.). As previously mentioned, payment authorization server 240 may evaluate a number of factors when determining whether to authorize a request. One such factor may include the location of POS terminal 220 in relation to the location of a mobile device 210 that is associated with a user corresponding to the payment card. Another factor may include whether appropriate mobile device information was received, by POS terminal 220, from mobile device 210.

Network 250 may include one or more wired and/or wireless networks. For example, network 250 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 250 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

FIGS. 3A and 3B are diagrams illustrating example data structures 300 and 350, respectively, which may be stored by mobile device location server 230 and/or payment authorization server 240. The fields shown for data structures 300 and 350 are examples. Data structures 300 and 350 may include fewer, additional, or different fields.

Data structure 300 may be used to maintain location information pertaining to mobile devices 210. Data structure 300 may be maintained by, for example, mobile device location server 230. Data structure 300 may include mobile device identifier (ID) field 310, subscriber identifier (ID) field 315, account identifier (ID) field 320, and location field 325. Mobile device identifier field 310 may store a value that identifies a particular mobile device 210. For example, mobile device identifier field 310 may store a Mobile Equipment Identifier (MEID) value (i.e., a globally unique number identifying a physical piece of mobile equipment), an International Mobile Station Equipment Identity (IMEI) value, an Electronic Serial Number (ESN), or some other value that identifies the hardware associated with mobile device 210.

Subscriber identifier field 315 may store a value that identifies a particular subscriber (user) of a mobile device 210. Subscriber identifier field 315 may include, for example, an International mobile Subscriber Identity (IMSI) value, a mobile device number, or some other value. The value of subscriber identifier field 315 may change when a user changes subscriber identity module (SIM) cards. For example, a user traveling to a different country may rent a SIM card at an airport, install the new SIM card, and begin to use the user's mobile device with the new SIM card.

Account identifier field 320 may include one or more values corresponding to a payment card. For example, account identifier field 320 may include a credit card number, an account identifier associated with a payment card, or another value. Account identifier field 320 may be used to correlate a query from payment authorization server 240 to mobile device 210. In some implementations, instead of storing an account identifier in data structure 300 (e.g., at mobile device location server 230), payment authorization server 240 may store an association of a payment card account with a mobile device identifier.

Location field 325 may store a current location of the mobile device associated with data structure 300 (i.e., of the mobile device identified in mobile device identifier field 310). As previously mentioned, the location of a particular mobile device 210 may be obtained from the mobile device (e.g., via GPS techniques) and/or from a network to which mobile device 210 is connected.

Two example records are illustrated for data structure 300. The first record may be associated with a MEID value of "AC123456789012" (field 310), an IMSI value of "404685505601234" (field 315), and the payment card account "smith" (field 320). The mobile device associated with the first record may currently be at the location defined by the latitude and longitude coordinates of 27.175015 and 78.042155, respectively. Similarly, the second record in data structure 300 may be associated with a MEID value of "AC12345678B112" (field 310), an IMSI value of "514685505601734" (field 315), and the payment card account "jones" (field 320). The mobile device associated with the second record may currently be at the location defined by the latitude and longitude coordinates of 38.907231 and −77.036464, respectively.

Data structure 350 may be used to maintain information, such as information used to assist in the authorization of payment transactions, relating to mobile devices 210. Data structure 350 may be maintained by, for example, mobile device location server 230 and/or payment authorization server 240. Data structure 350 may include account identifier (ID) field 355 and mobile device information (info) field 360.

Account identifier field 355 may include one or more values corresponding to a payment card. For example, account identifier field 355 may include a credit card number, an account identifier associated with a payment card, or another value. Mobile device information field 360 may include information associated with mobile devices 210 ("mobile device information"), and may include a passcode, an image, a value associated with mobile device 210, biometric information associated with the user of mobile device 210 (e.g., a fingerprint received by a fingerprint scanner on mobile device 210), or some other information.

Two example records are illustrated for data structure 350. The first record may be associated with an account identifier "smith" (field 355) and mobile device information field 360 may be associated with an image, such as an image taken or chosen by a user of a mobile device 210. The image may serve as a value that is associated with the user of the account. The second record may be associated with an account identifier "jones" (field 355) and mobile device information field 360 be associated with a passcode chosen a user of a mobile device 210. As with the image, the passcode may serve as a value that is associated with the user of the account. As will be described in more detail below, the mobile device information may be used as part of the authorization process of a payment card transaction.

Figure 4:
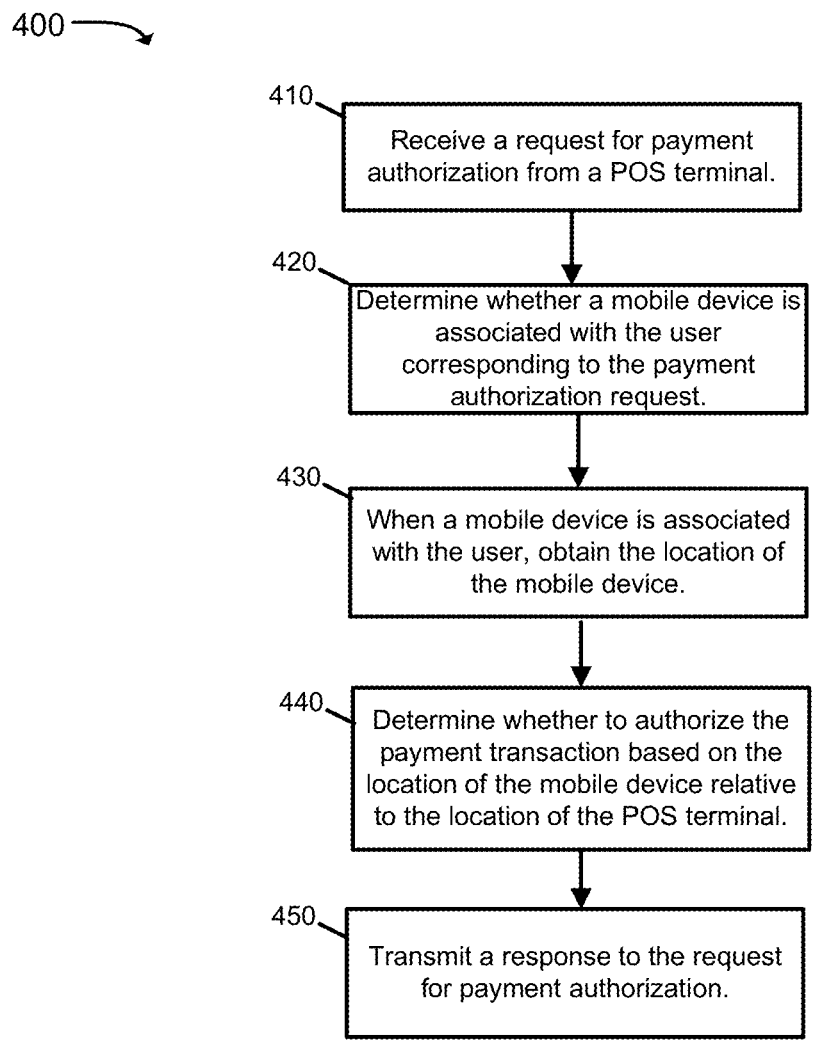
FIG. 4 is a flowchart illustrating an example of a process relating to authorization of a payment transaction for a payment card that is used at a POS terminal of a merchant.

FIG. 4 is a flowchart illustrating an example of a process 400 relating to authorization of a payment transaction for a payment card that is used at a POS terminal of a merchant. Process 400 may be performed by, for example, payment authorization server 240.

Process 400 may include receiving a request for payment authorization from a POS terminal (at 410). A user, associated with mobile device 210, may initiate a payment card transaction at a merchant. The user may swipe the payment card through POS terminal 220 and/or hand a salesperson the payment card for processing by POS terminal 220. POS terminal 220 may transmit a payment authorization request for the payment card transaction. The payment authorization request may be received by payment authorization server 240.

In some implementations, the payment authorization request may additionally include information describing the location of POS terminal 220. Alternatively or additionally, because POS terminal 220 may be generally immobile, locations associated with POS terminals 220 may be determined off-line or ahead of time (e.g., payment authorization server 240 may statically store the locations associated with various POS terminals 220).

Payment authorization server 240 may determine whether a mobile device is associated with the user corresponding to the payment authorization request (at 420). For example, a user of the payment card, at some point during initial application for the payment card or at a later time, may be given the option of registering a mobile device with the payment card. Payment authorization server 240 may correspondingly associate the user's payment card account with a particular mobile device or mobile device telephone. In this situation, payment authorization server 240 may use the location of the user's mobile device as a factor when determining whether to authorize the payment transaction.

When a mobile device is associated with the user, process 400 may further include obtaining the location of the mobile device of the user (at 430). The location of the mobile device of the user may be obtained through a query to mobile device location server 230. As previously mentioned, in one implementation, mobile device location server 230 may be operated by a telecommunications provider that provides a wireless cellular network. In this situation, mobile device location server 230 may be updated in response to locations of the mobile device that are determined by the network (e.g., based on the base station to which mobile device 210 is attached). Alternatively or additionally, mobile device 210 may transmit the location of mobile device 210 to mobile device location server 230. In this manner, mobile device location server 230 may maintain a current location of mobile device 210.

Process 400 may further include determining whether to authorize the payment card transaction based, at least in part, on the location of the mobile device relative to the location of the POS terminal (at 440). As previously mentioned, payment authorization server 240 may take into account a number of factors when determining whether to a payment request. At least one of the factors may be the determined location of mobile device 210. For example, if the location of POS terminal 220 is significantly different than the obtained location of mobile device 210, such as in a different state, in a different country, in a different part of town, at least a particular distance from POS terminal 220, or not in the store associated with POS terminal 220, payment authorization server 240 may determine to decline the payment request or indicate that the merchant should obtain additional identification information from the user before approving the transaction.

In some implementations, instead of determining whether or not to authorize the payment card transaction as a binary decision, process 400 may include using the location of the mobile device as a factor in generating a confidence score indicating relating to a confidence in the user of the payment card being the authorized user. The confidence score may be transmitted to the merchant, which may make a final authorization decision, or may be used in conjunction with other factors to make a final decision, of whether to authorize the payment, based on the confidence score.

Process 400 may further include transmitting a response to the request for the payment authorization (at 450). The response may be transmitted to the merchant that submitted the payment authorization request, such as to the POS terminal associated with the payment authorization request, and may indicate whether the payment card transaction is authorized and/or whether the merchant should perform additional actions (e.g., verifying the user's identity) before authorizing the payment card transaction.

Figure 5A:
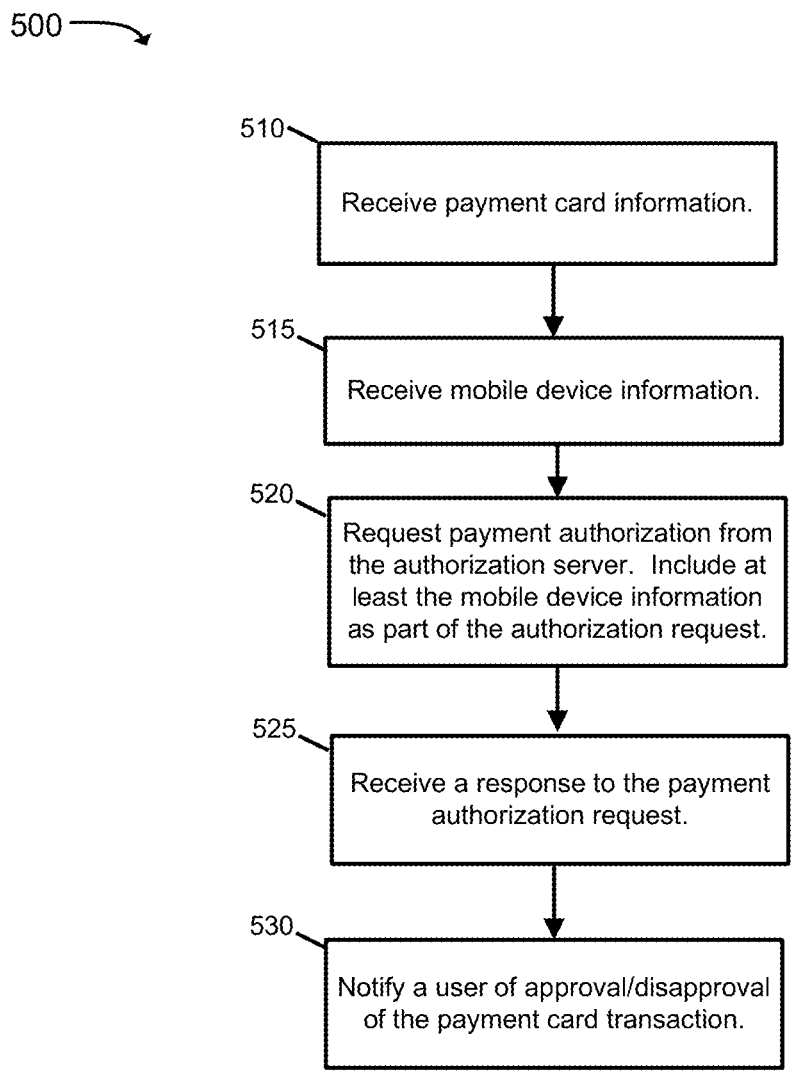
FIGS. 5A and 5B are flowcharts illustrating example processes relating to authorization of a payment transaction for a payment card that is used at a POS terminal of a merchant.
Figure 5B:
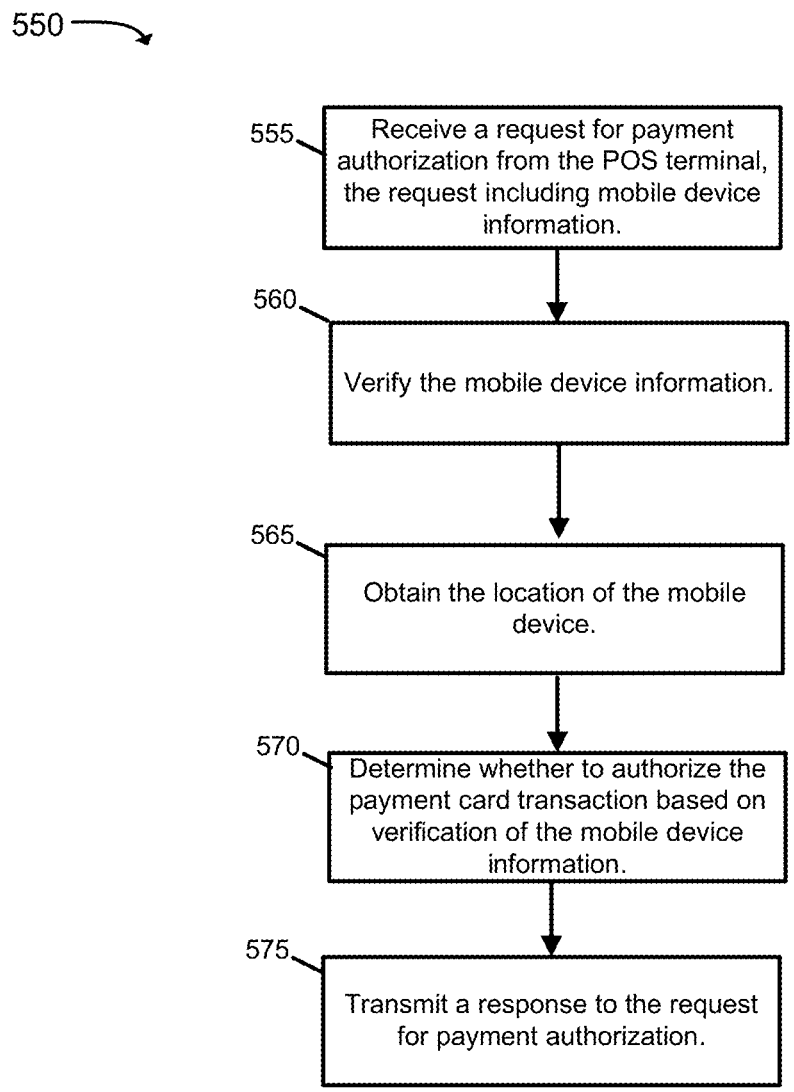

FIGS. 5A and 5B are flowcharts illustrating example processes 500 and 550, respectively, relating to authorization of payment transactions for a payment card that is used at a POS terminal of a merchant. In the implementations of FIGS. 5A and 5B, mobile device information may be obtained, by POS terminal 220, from mobile device 210 of the user. The mobile device information may be used during authorization of the payment transaction. Process 500 may be performed by, for example, by POS terminal 220 and process 550 may be performed by, for example, payment authorization server 240. The mobile device information (which may be directly obtained from the mobile device by POS terminal 220), may be used separately or in conjunction with the known location of the mobile device (as previously discussed with respect to FIG. 4).

As shown in FIG. 5A, process 500 may include receiving payment card information (at 510). A user, associated with mobile device 210, may initiate a payment card transaction at a merchant. The user may swipe the payment card through POS terminal 220 and/or hand a salesperson the payment card for processing by POS terminal 220.

Process 500 may further include receiving mobile device information (i.e., information from a mobile device associated with the user making the payment card transaction) (at 515). As previously mentioned, the mobile device information may include information used to identify the particular mobile device and/or the user associated with the mobile device. The mobile device information may include, for example, a passcode, an image, a value associated with mobile device, or some other information. The mobile device information may be predefined by the user. For example, the user may select a passcode or take a picture (e.g., of the user). In some implementations, mobile device information may include biometric information (e.g., a finger print, etc.). In some implementations, the mobile device information may be dynamically generated at the time of the payment card transaction (e.g., the user may take a "selfie" portrait of the user's face, which may be processed by facial recognition techniques to obtain biometric confirmation of the user). The mobile device information may be stored by payment authorization server 240, such as in data structure 350, at the initial creation of the mobile device information.

In some implementations, the mobile device information may be exchanged automatically between mobile device 210 and POS terminal 220. For example, in response to a user (or a store salesperson) initiating the payment card transaction at POS terminal 220, POS terminal 220 may wirelessly connect with mobile devices 210 in the vicinity of POS terminal 220 and request the mobile device information from the nearby mobile devices. In some implementations, mobile device 210 may provide an alert or confirmation request, to the user of mobile device 210, before transmitting the mobile device information to POS terminal 220. In other implementations, the mobile device information may be transmitted, from mobile device 210 and to POS terminal 220, in response to POS terminal 220 transmitting a particular code, such as the last four digits of the user's payment card (e.g., as determined at 510), to mobile device 210. Reception of the mobile device information (at 510) may be performed wirelessly using a technology such as NFC, Wi-Fi, Wi-Fi Direct, Bluetooth, Bluetooth low energy (BLE), or some other short range wireless technology.

In implementations in which POS terminal 220 may wirelessly obtain mobile device information from nearby mobile devices without explicit interaction by the user, POS terminal 220 may obtain mobile device information from multiple nearby mobile devices. In this situation, POS terminal 220 may filter the mobile device information to obtain the relevant mobile device information (i.e., the mobile device information that corresponds to the payment card transaction being processed by POS terminal 220) or provide all of the mobile device information to payment authorization server 240 for filtering.

Process 500 may further include requesting payment authorization from the authorization server (at 520). The payment authorization request may include the mobile device information as part of the authorization request (at 520). Additionally, the payment authorization request may include other information relevant to the authorization of the payment request, such as the amount of the purchase, the payment card account number, and/or other information. Payment authorization server 240 may determine whether to authorize the payment request based, at least in part, on the mobile device information. The operation of payment authorization server 240 with respect to authorizing the payment request, transmitted at 520, is described in more detail below with respect to process 550.

Process 500 may further include receiving a response to the payment authorization request (at 525). For example, payment authorization server 240, after determining whether to authorize or not authorize the payment, may transmit a response back to POS terminal 220.

Process 500 may further include notifying the user of the approval/disapproval of the payment card transaction (at 530). For example, POS terminal 220 may include display that notifies the user (and/or the merchant) whether the payment transaction is approved or not approved.

FIG. 5B illustrates an example process 550 relating to approval of the requested payment authorization performed with respect to process 500. As shown in FIG. 5B, process 550 may include receiving a request for payment authorization from the POS terminal (at 555). The request may include the mobile device information (at 555). The request may be received from POS terminal 220 (e.g., as transmitted, at 520, of process 500). In addition to the mobile device information, the request may include other information, such as the payment card number and the payment card security code.

Process 550 may further include verifying the mobile device information (at 560). For example, payment authorization server 240 may determine the mobile device information that was previously stored for the account (e.g., as stored in data structure 350). Payment authorization server 240 may compare the previously stored version of mobile device information with the received mobile device information.

In some implementations, in addition to the mobile device information, the location of mobile device 210, as discussed previously, may additionally be used as a factor that may be considered as part of the authorization of the payment request. Thus, optionally, the location of the mobile device may be obtained (at 565). The location of the mobile device may be obtained through a query to mobile device location server 230. When the location of the mobile device is not available from mobile device location server 230 or when the payment authorization is to be performed without obtaining the location of the mobile device, use of the location of the mobile device, as part of the payment authentication process, may be omitted.

Process 550 may further include determining whether to authorize the payment transaction based, at least in part, on verification of the mobile device information (at 570). As previously mentioned, payment authorization server 240 may take into account a number of factors when determining whether to authorize a payment card transaction. At least one of the factors may be whether the mobile device information was verified (i.e., at 560). For example, when the mobile device information cannot be verified, payment authorization server 240 may determine to decline the payment transaction or request that the merchant obtain additional identification information from the user before approving the transaction. In situations in which mobile devices in the vicinity of POS terminal 220 may automatically transmit mobile device information to POS terminal 220, it may be possibly that POS terminal 220 obtains mobile device information from other mobile devices (e.g., associated with other customers in the vicinity of POS terminal 220) but may not obtain mobile device information for the current payment transaction. In this situation, payment authorization server 240 may use successful verification of the mobile device information as a positive factor in determining whether to authorize the payment transaction. However, unsuccessful verification of the mobile device information may not necessarily lead to declining of the payment transaction.

In some implementations, when the location of mobile device can be determined (at 565), the location of the mobile device relative to the location of POS terminal 220 may also be used as a factor in determining whether to authorize the payment card transaction.

In some implementations, a score, such as an "authorization score" may be calculated. The authorization score may generally be increased when the mobile device information is verified for the POS terminal and/or when the mobile device is determined to be in the vicinity of the POS terminal.

Process 550 may further include transmitting a response to the request for the payment authorization (at 575). The response may be transmitted to the merchant that submitted the payment authorization request, such as to the POS terminal associated with the payment authorization request. In some implementations, the response may include the calculated authorization score. In this case, the merchant may make a final determination on whether to authorize the payment card transaction.

Figure 6A:
FIGS. 6A-6C are diagrams illustrating examples relating to obtaining and verifying mobile device information.
Figure 6B:
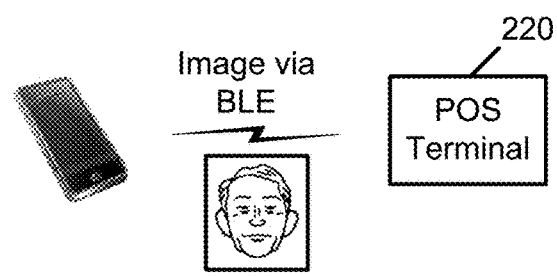
Figure 6C:

FIGS. 6A-6C are diagrams illustrating examples relating to obtaining and verifying mobile device information (e.g., as performed at 555 and 560 of FIG. 5B). The examples of mobile device information, as shown in FIGS. 6A-6C, are intended as non-limiting examples of communication technologies and/or types of mobile device information that may be used in payment card transaction authentication.

As illustrated in FIG. 6A, mobile device 210 may connect to POS terminal 220 via a NFC connection. For example, the user may touch or move mobile device 210 into close proximity of POS terminal 220. Mobile device 210 and POS terminal 220 may form a communication link via NFC, over which a value identifying mobile device 210 (e.g., an MEID value) may be exchanged.

As illustrated in FIG. 6B, mobile device 210 may connect to POS terminal 220 via a Bluetooth Low Power (BLE) connection. For example, in response to the user initiating a payment card transaction with POS terminal 220, POS terminal 220 and mobile device 210 may form a communication link via BLE. An image may be transmitted from mobile device 210 to POS terminal 220 over the BLE connection. For example, in one implementation, an image of the user, such as a image of the user's face (a "portrait") image may be transmitted to POS terminal 220. As another example, the user may take the portrait image as part of the payment transaction. Payment authorization server 240 may, for example, perform facial recognition techniques to verify that the uploaded portrait image corresponds to the user.

As illustrated in FIG. 6C, mobile device 210 may connect to POS terminal 220 via a Wi-Fi Direct connection. For example, in response to the user initiating a payment card transaction with POS terminal 220, POS terminal 220 and mobile device 210 may form a communication link via Wi-Fi Direct. A passcode, such as a four digit personal access number (e.g., "1209") may be communicated over the Wi-Fi Direct connection. In one implementation, the passcode may be entered by the user as part of the payment transaction. Payment authorization server 240 may verify the passcode as passcode corresponding to the user of mobile device 210.

Techniques were described above relating to obtaining the location of mobile device 210 to assist in authorization of payment card transactions. In some situations, a user traveling between countries may continue to use the same mobile device but may change subscriber identities, such as by changing SIM cards. For example, a user traveling to a foreign country may rent a SIM card, which the user may use for the duration of their stay in the foreign country, in order to obtain cellular network connectivity via a telecommunications provider in the foreign country.

Figure 7:
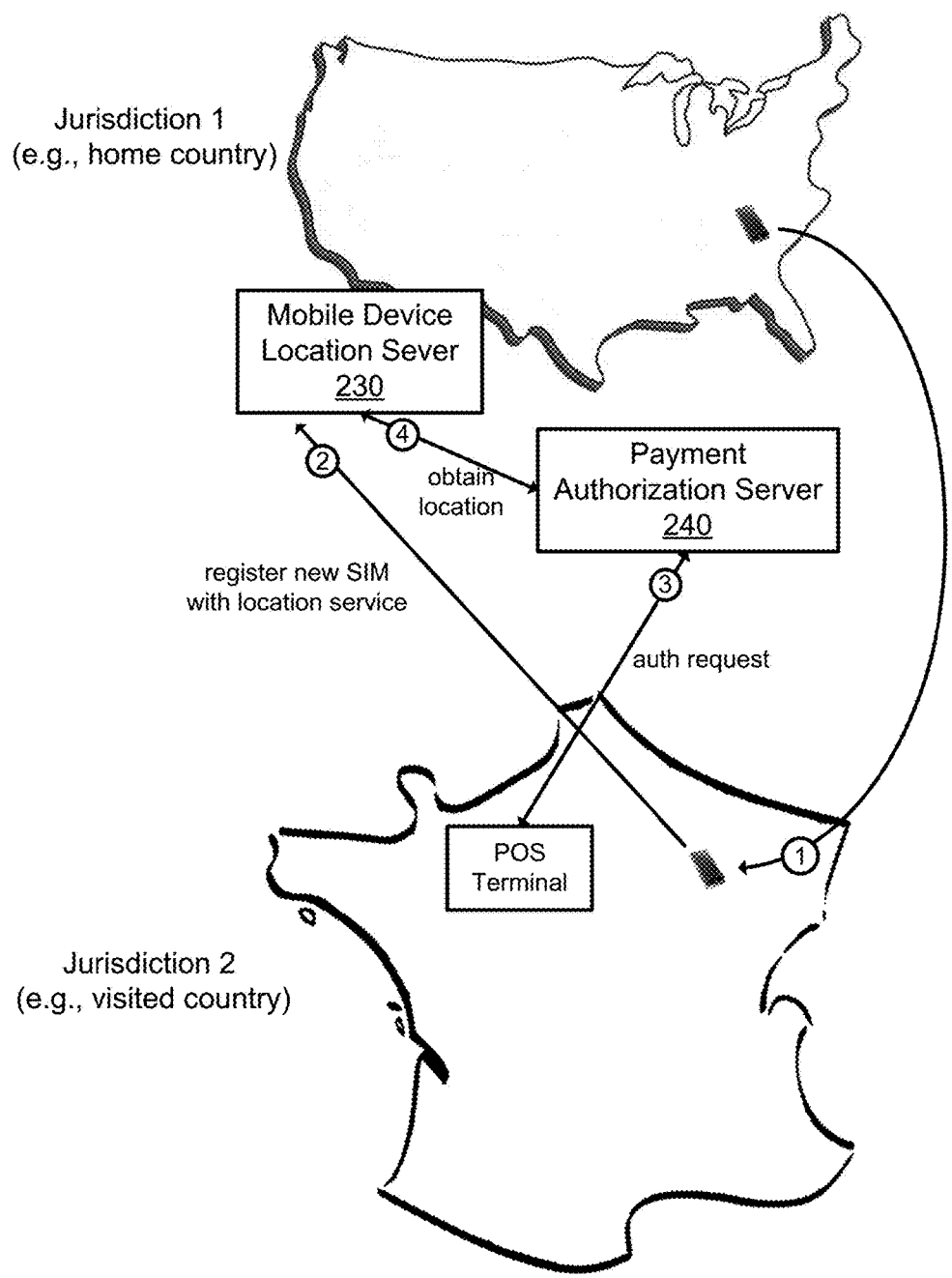
FIG. 7 is a diagram conceptually illustrating the use of the location of a mobile device to assist in payment card transactions when traveling between countries.

FIG. 7 is a diagram conceptually illustrating the use of the location of a mobile device to assist in payment card transactions when traveling between countries (e.g., between the user's home country (Jurisdiction 1) and a visited country (Jurisdiction 2)). Assume that a user, associated with the mobile device, travels between countries (arrow 1). The user may desire to continue to use the user's mobile device in the new country. In situations in which the communication technology of the user's mobile device is compatible with the communication technology used by the telecommunications provider in the visiting country, the user may be able to continue to use the user's mobile device, such as by renting a SIM card for the duration of the user's stay in the visiting country.

The user may register the mobile device, including the rented SIM card, with a location service, such as with mobile device location server 230 (arrow 2, "register new SIMM with location service"). Mobile device location server 230 may thus update the record, corresponding to the user, to indicate the installation of the new SIM card (e.g., subscriber identifier field 315, in data structure 300, may be updated). Registering the mobile device with mobile device location server 230 may include, for example, navigating to a particular web site in which the user may indicate that the user has changed the SIM card in the mobile device, dialing a predetermined number (e.g., an Automatic Number Announcement (ANI) number), or via another technique.

As the user travels within the visited country, the current location of the mobile device may be updated at mobile device location server 230. For example, the mobile device may include an application that periodically or occasionally transmits its location (e.g., as obtained through GPS-based techniques) to mobile device location server 230.

At some point, the user may make a POS transaction at a POS terminal of a merchant located in the country being visited. In the manner previously discussed, the POS terminal may request authorization for the payment card transaction from payment authorization server 240 (arrow 3, "auth request"). Payment authorization server 240 may obtain the location of the mobile device from mobile device location server 230 (arrow 4, "obtain location"), and use the obtained location as a factor in determining whether to authorize the payment card transaction. In this manner, the location of mobile device may be used to assist in optimizing payment card transactions even when a user has traveled to a country other than the user's home country. The use of the location of the mobile device in this manner may be particularly useful as credit card fraud associated with user using a payment card in a foreign country may be associated with relatively high levels of fraud, which may be reduced using the techniques described above.

Figure 8:
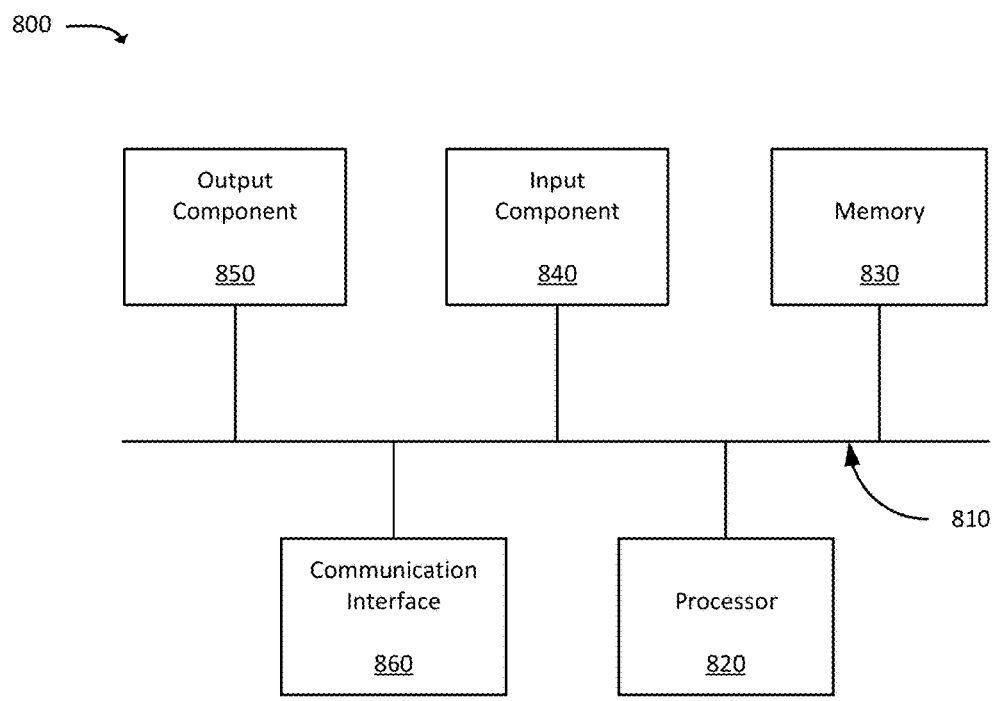
FIG. 8 is a diagram of example components of a computing device.

FIG. 8 is a diagram of example components of device 800. One or more of the devices described above (e.g., with respect to illustrated in FIGS. 1A, 1B, 2, 6A-6C, and/or 7) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a Bluetooth radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of operations have been described with regard to FIGS. 4, 5A, and 5B, the order of the operations may be modified in other implementations. Further, non-dependent blocks may be performed in parallel.

Additionally, while examples of data structures are illustrated in FIGS. 3A-3B as including certain types of information, in practice, these data structures may store additional, fewer, different, or differently arranged types of information than shown in these figures. Furthermore, while these data structures are shown as tables, in practice, these data structures may take the form of any other type of data structure, such as an array, a linked list, a hash table, a tree, and/or any other type of data structure.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving, by one or more devices and from a point-of-sale terminal, a request for authorization of a payment associated with a payment card;
   obtaining, by the one or more devices, location information relating to a location of a mobile device associated with a user of the payment card;
   receiving, from the point-of-sale terminal, additional information obtained from the mobile device, the additional information including biometric information associated with a user of the mobile device or a unique identifier of the mobile device, wherein receiving the additional information includes:
   obtaining the additional information based on the point-of-sale terminal wirelessly connecting to a plurality of mobile devices in a vicinity of the point-of-sale terminal and automatically obtaining, without explicit user interaction, the additional information from each of the plurality of mobile devices in the vicinity of the point-of-sale terminal, and
   filtering the additional information, obtained from the plurality of mobile devices, to remove the additional information corresponding to those of the plurality of mobile devices that are not the mobile device associated with the user of the payment card;
   determining, by the one or more devices and based at least on a location of the point-of-sale terminal, the location of the mobile device, and the additional information, whether to authorize the request for authorization of the payment; and
   transmitting, by one or more devices and to the point-of-sale terminal, a result of the determination of whether to authorize the payment.

2. The method of claim 1, wherein the request includes an indication of a location of the point-of-sale terminal.

3. The method of claim 1, wherein the determination of whether to authorize the request for authorization of the payment further includes:
   determining a distance between the location of the point-of-sale terminal and the location of the mobile device, wherein the result of the determination of whether to authorize the payment is a declined authorization when the distance is greater than a threshold.

4. The method of claim 1, wherein obtaining the location information further comprises:
   identifying the mobile device based on the request for authorization of the payment; and
   querying, based on the identification of the mobile device, a mobile device location server for the location of the mobile device.

5. The method of claim 4, wherein the mobile device location server is a server operated by a telecommunications provider that provides cellular network connectivity to the mobile device.

6. The method of claim 1, wherein the additional information obtained from the mobile device additionally includes a passcode entered by a user of the mobile device.

7. A system comprising:
a non-transitory memory device storing computer-executable instructions; and one or more processors configured to execute the computer-executable instructions, wherein executing the computer-executable instructions causes the one or more processors to:
receive, from a point-of-sale terminal, a request for authorization of a payment associated with a payment card;
obtain location information relating to a location of a mobile device associated with a user of the payment card;
receive, from the point-of-sale terminal, additional information obtained from the mobile device, the additional information including biometric information associated with a user of the mobile device or a unique identifier of the mobile device, wherein receiving the additional information includes:
obtaining the additional information based on the point-of-sale terminal wirelessly connecting to a plurality of mobile devices in a vicinity of the point-of-sale terminal and automatically obtaining, without explicit user interaction, the additional information from each of the plurality of the mobile devices in the vicinity of the point-of-sale terminal, and
filtering the additional information, obtained from the plurality of mobile devices, to remove the additional information corresponding to those of the plurality of mobile devices that are not the mobile device associated with the user of the payment card;
determine, based at least on a location of the point-of-sale terminal, the location of the mobile device, and the additional information, whether to authorize the request for authorization of the payment; and
transmit, to the point-of-sale terminal, a result of the determination of whether to authorize the payment.

8. The system of claim 7, wherein the request includes an indication of a location of the point-of-sale terminal.

9. The system of claim 7, wherein, when determining to authorize the request for authorization of the payment, the computer-executable instructions further cause the one or more processors to:
determine a distance between the location of the point-of-sale terminal and the location of the mobile device, wherein the result of the determination of whether to authorize the payment is a declined authorization when the distance is greater than a threshold.

10. The system of claim 7, wherein, when obtaining the location information, the computer-executable instructions further cause the one or more processors to:
identify the mobile device based on the request for authorization of the payment; and
query, based on the identification of the mobile device, a mobile device location server for the location of the mobile device.

11. The system of claim 7, wherein the additional information obtained from the mobile device additionally includes a passcode entered by a user of the mobile device.

12. A method comprising:
receiving, by a point-of-sale terminal and from a particular mobile device, a first request to authorize payment for merchandise via a payment card, the request including information identifying the payment card;
establishing, by the point-of-sale terminal, a local wireless connection with a plurality of mobile devices, including the particular mobile device, in a vicinity of the point-of-sale terminal;
automatically obtaining, without explicit user interaction, by the point-of-sale terminal and via the local wireless connection, information from each of the plurality of mobile devices in the vicinity of the point-of-sale terminal, wherein the information from the plurality of mobile devices includes biometric information associated with users of the plurality of mobile devices or unique identifiers of the plurality of mobile devices;
transmitting, by the point-of-sale terminal and to an authorization server, a second request to authorize payment for the merchandise via the payment card, the second request including the information identifying the payment card and the information that was automatically obtained from the plurality of mobile devices;
receiving, by the point-of-sale terminal, a response to the second request; and
authorizing or declining, by the point-of-sale terminal and based on the response, the first request to authorize payment for the merchandise.

13. The method of claim 12, wherein the local wireless connection includes a Near Field Communication (NFC), Wi-Fi, Wi-Fi Direct, Bluetooth, or Bluetooth Low Energy (BLE) connection.

14. The method of claim 12, wherein the information from the particular mobile device includes a fingerprint of the user of the particular mobile device or an image of a face of the user of the particular mobile device.

15. The method of claim 12, wherein the second request additionally includes a location of the point-of-sale terminal.

16. The method of claim 12, wherein the response to the second request is based at least on the information identifying the payment card, the information from the mobile device, and a location of the mobile device, the location of the mobile device being determined by the authorization server.

17. The method of claim 12, further including:
filtering, by the point-of-sale terminal, the information obtained from each of the plurality of mobile devices, to remove information corresponding to those of the plurality of mobile devices that are not the particular mobile device.

* * * * *